Nov. 20, 1951 R. P. MITCHELL 2,576,028
MOVABLY MOUNTED FOOD SUPPORT
Filed Feb. 6, 1948 2 SHEETS—SHEET 1

R. P. MITCHELL
INVENTOR
BY Herbert J. Brown
ATTORNEY

Nov. 20, 1951  R. P. MITCHELL  2,576,028
MOVABLY MOUNTED FOOD SUPPORT
Filed Feb. 6, 1948  2 SHEETS—SHEET 2

R. P. MITCHELL
INVENTOR
BY Herbert J. Brown
ATTORNEY

Patented Nov. 20, 1951

2,576,028

UNITED STATES PATENT OFFICE 2,576,028

MOVABLY MOUNTED FOOD SUPPORT

Reginald P. Mitchell, Fort Worth, Tex.

Application February 6, 1948, Serial No. 6,642

6 Claims. (Cl. 99—397)

This invention relates to cooking apparatus and has reference to a mechanized device for broiling or barbecuing steaks or the like.

An object of the invention is to provide a motor driven device of the referred to class whereby the opposite sides of the steak being cooked are intermittently exposed to the fire and thereby cooking the meat evenly.

Another object of the invention is to provide, in addition to the foregoing object, a spit arrangement comprised of a pair of racks whereby steaks of various thicknesses may be accommodated.

Another object of the invention is to provide, in the spit referred to, an arrangement for opening the racks in such a manner that the meat is supported when removing the same, and thereby preventing the meat from falling into the fire.

These and other objects will become apparent from the following description of the accompanying drawings, wherein.

Figure 1:
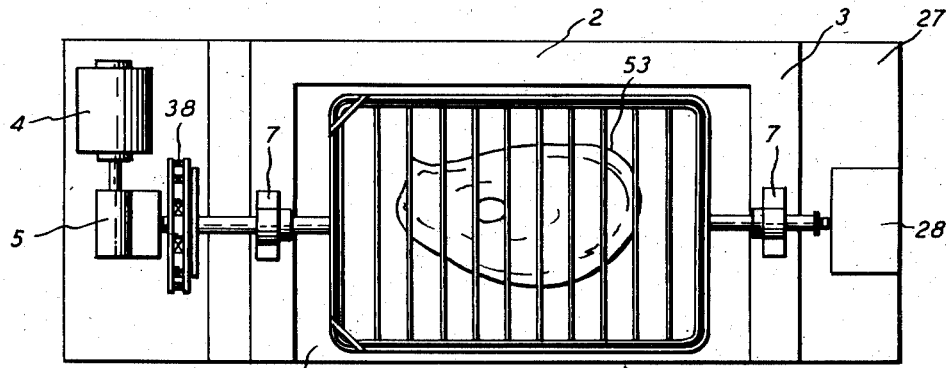
Figure 1 is a plan view of a barbecue pit embodying the features of the present invention.

The form of the invention illustrated in Figurges 1, 2, and 5, includes a rectangular base 1 having a back wall 2 and end walls 3. A motor 4 is mounted on an extension of the base 1 and outwardly of one of the walls 3, and which motor is provided with a reduction gear 5 having a driving sprocket 6. The axis of the sprocket 6 is parallel with the length of the base 1.

Figure 3:
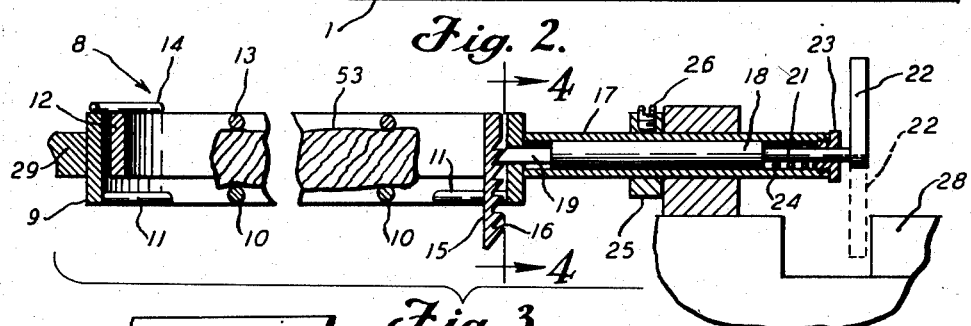
Figure 3 is an enlarged view of the spit assembly, shown in broken section, and particularly illustrating the foolproof arrangement for opening the racks of the spit.
Figure 4:
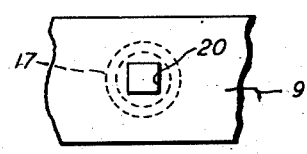
Figure 4 is a broken view taken on lines 4—4 of Figure 3.

Bearings 7 are mounted on the end walls 3 for rotatably supporting a spit assembly 8. As particularly shown in Figure 3, the spit assembly 8 includes a rectangular frame 9 having cross rods 10 secured thereacross near its bottom edge. The inside corners at the lower edge of the frame 9 are provided with diagonal stops 11. The rods 10 and stops 11, as well as all the secured parts of the assembly 8, are welded in place.

Within the first referred to frame 9 there is a removable rectangular frame 12 which has cross rods 13 near its top edge. The outside frame 9 is provided with diagonal stops 14 at the corners of one end of the said frame for engaging the corresponding corners of the inner frame 12. The end of the inner frame 12 opposite the diagonal stops 14 is provided with a depending projection 15 having teeth 16 on its outer surface, and which teeth extend therealong upwardly into the outer surface of the said inner frame. The end of the outer frame 9 adjacent the projection 15 is provided with a tubular shaft 17 along the longitudinal axis of the spit 8, and which shaft is supported in one of the previously referred to bearings 7. Within the tubular shaft 17 there is a slidable cylindrical guide 18 having a square projection 19 at one end for slidably passing through a square opening 20 in the outer spit frame 9. The end of the projection 19 is beveled to engage the teeth 16 of the projection 15. The remaining end of the guide 18 is provided with an extension 21 of reduced diameter for supporting a handle 22 outwardly of the tubular shaft 17. The end shaft 17 is provided with a threaded plug 23 and a compression spring 24 which is positioned between the said plug and the guide 18, and around the extension 21. A collar 25 having a set screw 26 is positioned on the tubular shaft 17 inwardly of and against the bearing 7. A step 27 is formed in the upper outer edge of the wall 3 supporting the tubular shaft 17 to accommodate the handle 22 when the latter is in its down position, and a projection 28 extends upwardly from the step to prevent the outwardly movement of the handle 22 when the same is in its down position, as indicated by dotted lines Figure 3.

Figure 10:
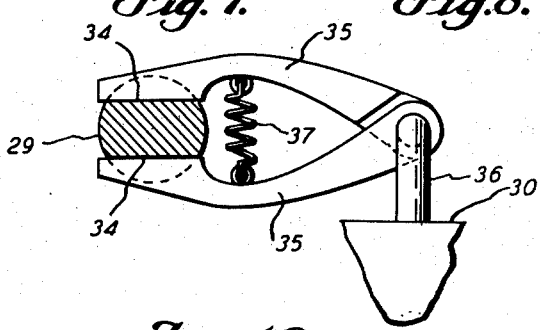
Figure 10 is an elevational view of a modified form of mechanism for steadying the spit supporting shaft during the period of time when the racks are horizontal.

The end of the outer frame 9, opposite the end supported by the tubular shaft 17, is provided with another shaft 29, both of the said shafts being in axial alignment. The last described shaft 29 is supported by one of the previously referred to bearings 7 on an end wall 3. The latter wall is provided with a step 30 upon which there is a tubular guide 31 which projects upwardly beneath the extending end of the shaft 29. A headed pin 32 is slidably disposed within the upper end of the tubular guide 31 and a compression spring 33 around the said guide normally forces the head of the pin 32 upwardly against the shaft 29 which, at this point, is provided with opposing flat surfaces 34. A modified form of the last referred to arrangement is illustrated in Figure 10 wherein a pair of jaws 35 are pivotally supported on an arm 36 secured in the step 30 of the end wall 3. The jaws 35 have a tension spring 37 secured therebetween for drawing the jaws against the flat surfaces 34 of the shaft 29.

The outer end of the shaft 29 supports a freely rotatable sprocket 38 which is driven by the first described sprocket 6 by means of an endless chain 39.

Figure 5:
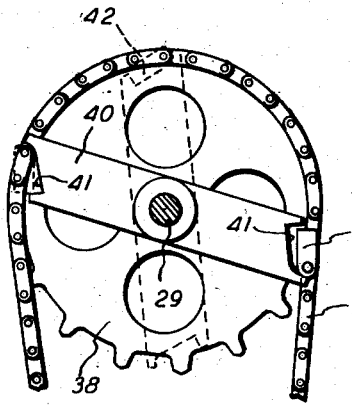
Figure 5 is a transverse sectional view of the spit shaft taken on lines 5—5 of Figure 2 and showing an arrangement for imparting intermittent action for rotating the spit assembly.

A double arm 40 is secured to the shaft 29 near the sprocket 38, and the ends of the arm are recessed, as at 41, to accommodate a dog 42 pivotally secured at one of its ends to the chain 39. The pivoted end of the dog 42 is preferably round, as shown in Figure 5, whereas the other end is preferably square. Also, the recesses 41 in the double arm 40 are angularly disposed to better receive and accommodate the dog 42 when the latter is engaged in either of the said recesses, as indicated by dotted lines at the top of Figure 5.

Figure 6:
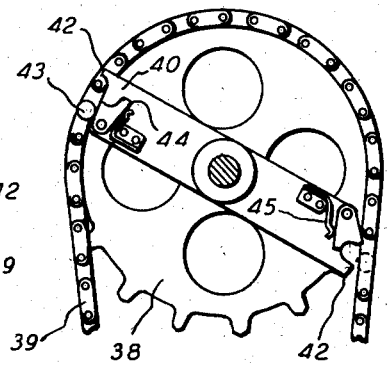
Figure 6 is a view similar to Figure 5 but showing an alternate arrangement for imparting intermittent rotation to the spit assembly.
Figure 7:
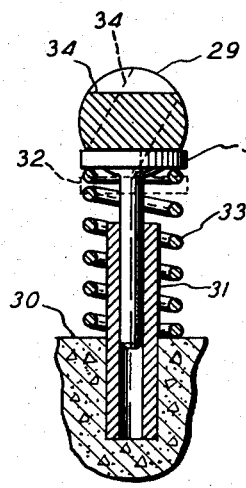
Figure 7 is a vertical sectional view of a mechanism for frictionally engaging the spit shaft and maintaining the spit in a horizontal position during the intervals when the racks are horizontally positioned over the fire.

The described double arm 40 for coaction with the dog 42, provides one embodiment for imparting intermittent action to the shaft 29 and consequently the spit assembly 8. A similar mechanism for providing intermittent action of the shaft 29 is illustrated in Figure 6 wherein the double arm 40 is provided with projections 42 at opposite corners. A projecting lug 43 is attached to the side of the chain 39 and engages either of the arm projections 42, and in so doing presses a pivoted latch 44 inwardly for better securing the said lug. The latches 44 are normally extended outwardly by means of springs 45 mounted on the double arm 40.

Figures 8, 9:
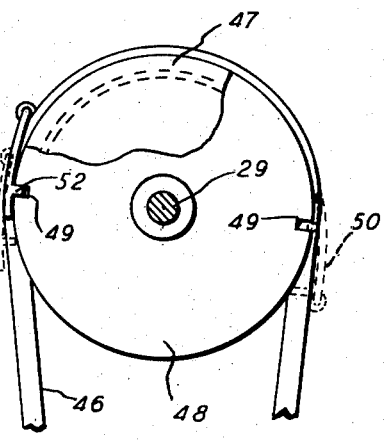
Figure 8 is a side elevational view of a pulley arrangement which is a further modified form of mechanism for imparting intermittent rotation to the spit.
Figure 9 is an elevational view taken at a right angle with respect to Figure 8.

A further modified form for imparting intermittent action to the shaft 29 is illustrated in Figures 8 and 9 wherein a belt 46 is employed instead of the chain 39. In the referred to Figures 8 and 9, the sprocket 38 is replaced by a driven pulley 47 freely rotatable on the shaft 29 over which the belt 46 passes. A pulley (not shown) driven by the reduction gear 5 drives the belt 46. Instead of the double arm 40, a disk 48 is secured to the shaft 29 and the periphery of the said disk is notched at points opposite each other as indicated at 49. A pawl 50 is pivotally mounted on the belt 46 by means of an eyelet 51 at one of the pawl's ends, whereas the length of the pawl is angularly disposed and extends over the periphery of the disk 48; and the end of the pawl 50, opposite its pivotal connection, is provided with an inwardly extending lug 52 for alternately engaging the disk recesses 49.

Figure 2:
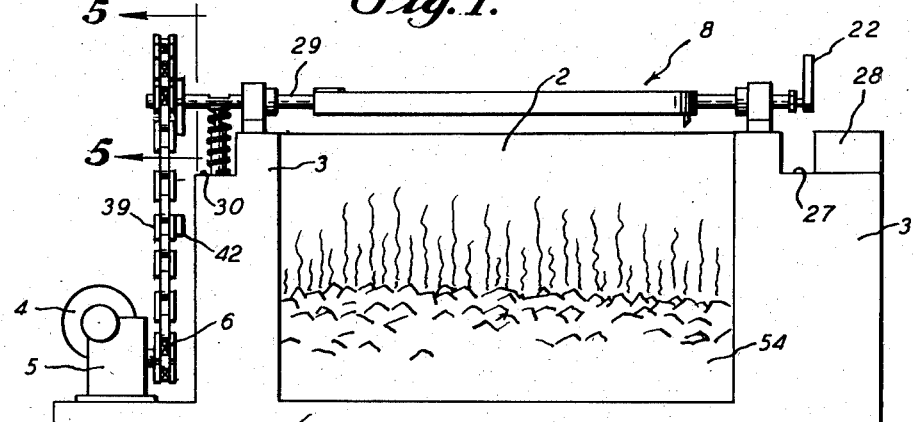
Figure 2 is a front elevational view of Figure 1.

All of the described forms of the invention are operated in the same manner. The meat 53 to be cooked is placed between the upper rods 13 and the lower rods 10 of the spit assembly 8 by removing the inner frame 12 from the outer frame 9 by pulling outwardly on the handle 22 when the latter is in its upright position. The meat 53 is then secured between the rods 13 and 10 by engaging one end of the inner frame 12 against the diagonal stops 14 across the upper end of the outer frame 9; and the said frames are held in closed position by reason of engagement of the guide projection 19 in the teeth 16, as particularly shown in Figure 3, and thus accommodates various thicknesses of meat 53. A bed of coals 54 is positioned on the base 1 and within the walls 2 and 3 for cooking the meat 53 in the spit assembly 8. The assembly 8 is normally held in a horizontal position by reason of the flat surfaces formed in the shaft 29 and the spring action of the headed pin 32 or the jaws 35 thereagainst. In the form of the invention illustrated in Figures 1, 2, and 5, the chain 39, driven by the motor 4, carries the pivoted dog 42 upwardly to engage one of the recesses 41 at one end of the double arm 40. As the dog 42 moves around the sprocket 38, the arm 40 is caused to complete one-half cycle, overcoming the spring loaded pin 32 on spring loaded jaws 35, the spit 8 is caused to turn over and exposes the opposite side of the meat 53 to the bed of coals 54. As the movement of the chain 39 continues, the action is again repeated causing the intermittent turning of the spit 8.

The operation of the mechanism illustrated in Figure 6 is substantially the same as described for Figure 5, but the lug 43 acts against the arm projection 42 causing the arm 40 to complete one-half revolution as the said lug moves about the sprocket 38. The latches 44 operate in the manner previously referred to for engaging the lug 43 during the last referred to period of operation.

Similarly, the form of mechanism for intermittent action illustrated in Figures 8 and 9 operates in substantially the same manner as the foregoing. The pawl 50 pivotally carried on the belt 46 engages one of the recesses 49 in the disk 48 and causes the shaft 29 to complete one-half of a revolution. As the belt continues, the other or opposing recess 49 is engaged after one cycle of the belt, causing the shaft 29 to turn another one-half revolution. Thus, intermittent action is provided for exposing opposite sides of the meat 53 to the coals 54 and providing successive but intermittent rotation of the spit 8.

The described forms of the invention are not restrictive, but may be made in many ways within the scope of the appended claims.

I claim:

1. In a cooking apparatus, an elongated rack assembly mounted on a base for rotary action about its longitudinal axis and comprising a rotatably supported outer frame and an inner frame adapted to be removed from the said outer frame, stop means for holding said inner frame in said outer frame, slidable means aligned within the referred to axis for detachably securing the said inner frame within the said outer frame, handle means laterally projecting from the first named means, and a projecting stop secured to said base outwardly of the said handle means whereby the said slidable means cannot be operated except when the said rack assembly is in a horizontal position, and the said inner frame is positioned upwardly of the said outer frame.

2. In a cooking apparatus, the combination of a rack assembly mounted on a base for rotary action about its longitudinal axis, said rack assembly comprising inner and outer frames, one of said frames being detachably received within the other, stop means for holding said inner frame in said outer frame, a sliding latch for engaging said frames together, said latch including an extension along the axis of rotation, a perpendicular handle attached to the outer end of said latch, an upwardly directed projection secured to said base outwardly of said handle and arranged for preventing the outward displacement of said handle when the latter is in its down position, and means intermittently rotating said rack.

3. In a cooking apparatus of the described class, a rack assembly comprising an outer frame, shafts projecting from opposite ends of said frame and at least one of said shafts being tubular, bearings supporting the respective said shafts, an innner frame having one end thereof opposite said tubular shaft, stop means on said outer frame for holding the said inner frame in place, a latch slidably mounted in said tubular shaft and through the adjacent portion of said outer frame, and means carried by said inner frame positioned to engage the inner end of said latch.

4. In a cooking apparatus of the described class, a rack assembly comprising an outer frame, shafts projecting from opposite ends of said frame and at least one of said shafts being tubular, bearings supporting the respective said shafts, an inner frame having one end thereof supported within said outer frame in the end thereof opposite said tubular shaft, a latch slidably mounted in said tubular shaft and through the adjacent portion of said outer frame, stop means on said outer frame for holding said inner frame in place, a perpendicular projection carried by said inner frame and positioned opposite the inner end of said latch, and teeth on the outer surface of said projection adapted to be engaged by said latch.

5. In a cooking apparatus of the described class, a rack assembly comprising a pair of frames, stop means holding one said frame against the other said frame, shafts projecting from opposite ends of one of said frames, and at least one of said shafts being tubular, bearings supporting respective said shafts, the remaining said frame having one end thereof supported within the first said frame in the end thereof opposite said tubular shaft, a latch slidably mounted in said tubular shaft and through the adjacent portion of the adjacent said frame, and means carried by the remaining said frame and positioned to engage the inner end of said latch.

6. In a cooking apparatus of the described class, a rack assembly comprising a pair of frames, stop means holding one said frame against the other said frame, shafts projecting from opposite ends of one of said frames and at least one of said shafts being tubular, bearings supporting the respective said shafts, the remaining said frame having one end thereof supported by the end of the first said frame opposite said tubular shaft, a latch slidably mounted in said tubular shaft and through the adjacent portion of the adjacent said frame, a perpendicular projection carried by the remaining said frame and positioned opposite the inner end of said latch, teeth on the outer surface of said projection, the perpendicular handle on the outer end of said latch, and stop means positioned outwardly of and below the outer end of said latch and arranged whereby said handle cannot be moved outwardly when the latter is in its down position.

REGINALD P. MITCHELL.

REFERENCES CITED

The following references are of record in the file of this patent:

UNITED STATES PATENTS

| Number | Name | Date |
|---|---|---|
| 431,550 | Brooks | July 8, 1890 |
| 472,595 | Wachs | Apr. 12, 1892 |
| 547,593 | Wagoner | Oct. 8, 1895 |
| 890,219 | Cook | June 9, 1908 |
| 1,331,760 | Harris | Feb. 24, 1920 |
| 1,405,058 | Moore | Jan. 31, 1922 |
| 1,432,161 | Demuth | Oct. 17, 1922 |
| 1,718,961 | Humphrey | July 2, 1929 |
| 1,775,029 | Hippenmeyer | Sept. 2, 1930 |
| 1,786,300 | Harrison | Dec. 23, 1930 |
| 1,804,143 | Birdsall | May 5, 1931 |
| 1,899,335 | Kastner | Feb. 28, 1933 |
| 1,952,433 | Halstead | Mar. 27, 1934 |
| 2,161,089 | Reinwald | June 6, 1939 |
| 2,225,861 | Dufour | Dec. 24, 1940 |
| 2,280,131 | Rossini et al. | Apr. 21, 1942 |
| 2,297,825 | Bobo | Oct. 6, 1942 |
| 2,306,519 | Bobo | Dec. 29, 1942 |
| 2,349,617 | Gorman | May 23, 1944 |
| 2,352,489 | Melin | June 27, 1944 |
| 2,542,109 | Benson | Feb. 20, 1951 |

FOREIGN PATENTS

| Number | Country | Date |
|---|---|---|
| 272,453 | Great Britain | July 4, 1928 |